(12) United States Patent
Mun et al.

(10) Patent No.: US 10,043,520 B2
(45) Date of Patent: Aug. 7, 2018

(54) MULTILEVEL SPEECH RECOGNITION FOR CANDIDATE APPLICATION GROUP USING FIRST AND SECOND SPEECH COMMANDS

(71) Applicant: SAMSUNG ELECTRONICS CO., LTD, Suwon-si (KR)

(72) Inventors: Minyoung Mun, Seoul (KR); YoungSang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 14/558,479

(22) Filed: Dec. 2, 2014

(65) Prior Publication Data

US 2016/0012820 A1 Jan. 14, 2016

(30) Foreign Application Priority Data

Jul. 9, 2014 (KR) .......................... 10-2014-0086080

(51) Int. Cl.
| | | |
|---|---|---|
| G10L 15/183 | (2013.01) | |
| G10L 15/07 | (2013.01) | |
| G10L 15/32 | (2013.01) | |
| G10L 15/18 | (2013.01) | |
| G10L 15/22 | (2006.01) | |

(52) U.S. Cl.
CPC .......... *G10L 15/32* (2013.01); *G10L 15/1822* (2013.01); *G10L 2015/223* (2013.01)

(58) Field of Classification Search
CPC ........... G10L 2015/0635; G10L 15/065; G10L 15/183; G10L 15/22; G10L 2015/223; G10L 15/07

USPC .......................... 704/244, 251, 270, 275, 255
See application file for complete search history.

(56) References Cited

U.S. PATENT DOCUMENTS

| | | | | |
|---|---|---|---|---|
| 5,664,061 A | * | 9/1997 | Andreshak | G10L 15/22 704/231 |
| 6,182,038 B1 | * | 1/2001 | Balakrishnan | G10L 15/187 704/250 |
| 6,192,339 B1 | * | 2/2001 | Cox | G10L 15/30 704/270 |
| 6,246,981 B1 | * | 6/2001 | Papineni | G10L 15/22 704/235 |
| 6,298,324 B1 | * | 10/2001 | Zuberec | G10L 15/19 704/251 |
| 6,353,814 B1 | | 3/2002 | Weng | |
| 6,363,348 B1 | * | 3/2002 | Besling | G10L 15/34 704/251 |
| 6,484,136 B1 | | 11/2002 | Kanevsky et al. | |
| 6,742,021 B1 | * | 5/2004 | Halverson | G06F 17/30663 709/218 |

(Continued)

FOREIGN PATENT DOCUMENTS

KR 10-2006-0070603 6/2006

*Primary Examiner* — Martin Lerner
(74) *Attorney, Agent, or Firm* — NSIP Law

(57) ABSTRACT

A multilevel speech recognition method and an apparatus performing the method are disclosed. The method includes receiving a first speech command from a user through a speech interface, and extracting a keyword from the first speech command. The method also includes providing a candidate application group of a category providing a service associated with the keyword, and processing a second speech command from the user associated with an application selected from the candidate application group.

17 Claims, 7 Drawing Sheets

(56) References Cited

U.S. PATENT DOCUMENTS

| | | | |
|---|---|---|---|
| 8,612,212 B2 | 12/2013 | Riccardi | |
| 8,831,957 B2* | 9/2014 | Taubman | G10L 15/183 704/270 |
| 8,990,088 B2* | 3/2015 | Morton | G10L 15/193 704/251 |
| 9,111,540 B2* | 8/2015 | Plumpe | G10L 15/065 |
| 9,189,197 B1* | 11/2015 | Lagassey | G06F 3/048 |
| 9,190,057 B2* | 11/2015 | Hoffmeister | G10L 15/32 |
| 9,343,068 B2* | 5/2016 | Yun | G10L 17/005 |
| 9,361,084 B1* | 6/2016 | Costa | G10L 19/00 |
| 9,401,140 B1* | 7/2016 | Weber | G10L 15/00 |
| 9,741,343 B1* | 8/2017 | Miles | G10L 15/265 |
| 2002/0087315 A1* | 7/2002 | Lee | G10L 15/1822 704/9 |
| 2003/0182131 A1* | 9/2003 | Arnold | G10L 15/32 704/275 |
| 2006/0287866 A1* | 12/2006 | Cross, Jr. | G10L 15/197 704/275 |
| 2007/0055525 A1* | 3/2007 | Kennewick | G10L 15/08 704/257 |
| 2007/0083374 A1* | 4/2007 | Bates | G10L 15/197 704/257 |
| 2008/0040099 A1* | 2/2008 | Wu | G06F 17/275 704/9 |
| 2009/0106027 A1* | 4/2009 | Teranishi | G10L 15/06 704/262 |
| 2010/0175020 A1* | 7/2010 | Kim | G10L 15/22 715/783 |
| 2010/0318359 A1* | 12/2010 | Hamaker | G10L 15/197 704/257 |
| 2012/0173237 A1 | 7/2012 | Dow et al. | |
| 2012/0253799 A1 | 10/2012 | Bangalore et al. | |
| 2013/0090921 A1 | 4/2013 | Liu et al. | |
| 2013/0253928 A1* | 9/2013 | Bringert | G10L 15/28 704/235 |
| 2013/0289996 A1* | 10/2013 | Fry | G10L 15/32 704/257 |
| 2014/0067394 A1* | 3/2014 | Abuzeina | G10L 15/144 704/244 |
| 2014/0278419 A1* | 9/2014 | Bishop | G10L 15/22 704/249 |
| 2014/0278420 A1* | 9/2014 | Meloney | G10L 15/20 704/249 |
| 2014/0316784 A1* | 10/2014 | Bradford | G10L 15/18 704/245 |
| 2015/0088523 A1* | 3/2015 | Schuster | G10L 15/22 704/275 |
| 2015/0262578 A1* | 9/2015 | Ibuki | G10L 15/22 704/246 |
| 2015/0262583 A1* | 9/2015 | Kanda | G10L 15/22 704/275 |
| 2015/0302855 A1* | 10/2015 | Kim | G10L 17/22 704/275 |

* cited by examiner

MULTILEVEL SPEECH RECOGNITION FOR CANDIDATE APPLICATION GROUP USING FIRST AND SECOND SPEECH COMMANDS

CROSS-REFERENCE TO RELATED APPLICATION

This application claims the benefit under 35 USC § 119(a) of Korean Patent Application No. 10-2014-0086080, filed on Jul. 9, 2014, in the Korean Intellectual Property Office, the entire disclosure of which is incorporated herein by reference for all purposes.

BACKGROUND

1. Field

The following description relates to a multilevel speech recognition method and an apparatus performing the method, and more particularly, to a method and an apparatus to increase a degree of accuracy and usability of speech recognition by processing a speech command of a user in a stepwise manner.

2. Description of Related Art

A speech user interface refers to a more natural and intuitive interface than a touch interface. A speech user interface (SUI) is a user interface that utilizes speech recognition to enable a system to respond to voice commands and entries. The SUI is used, for instance, in computer systems, PDAs, or cell phones. The key difference between a SUI and an interactive voice response system is that the former accepts continuous speech and handles an extensive vocabulary, while the latter responds only specific words or short phrases. SUI is also called speech interface, or voice user interface.

Thus, the speech user interface is gaining attention as a next-generation interface that may compensate for flaws found in the touch interface. In addition, the speech user interface is gaining increased prominence due to the limited use of the touch interface with the advent of glasses-type or watch-type wearable devices.

However, a degree of recognizing a speech command of a user through the speech interface still remains at a low level and; thus, a usability of the speech interface is low. Accordingly, research has been conducting on increasing the usability of the speech interface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a multilevel speech recognition method, the method includes receiving a first speech command from a user through a speech interface; extracting a keyword from the first speech command; providing a candidate application group of a category providing a service associated with the keyword; and processing a second speech command from the user associated with an application selected from the candidate application group.

The processing includes recognizing the application from the candidate application group using a category speech recognition model, which comprises an acoustic model and a linguistic model based on a set of words associated with the category; and processing the second speech command associated with the application using an application speech recognition model, which comprises an acoustic model and a linguistic model based on a set of words associated with the application.

The category may be changed based on a use pattern of the user obtained from the first speech command and the second speech command.

The category speech recognition model may be updated based on a characteristic and a use pattern of the user obtained from the first speech command.

The application speech recognition model may be updated based on a characteristic and a use pattern of the user obtained from the second speech command associated with the application.

In accordance with an illustrative configuration, there is provided a non-transitory computer-readable storage medium comprising a program comprising instructions to cause a computer to perform the method described above.

In accordance with another illustrative configuration, there is provided a multilevel speech recognition method, the method including recognizing a speech command of a user through a speech interface; determining, using a processor, whether the speech command comprises an application; and executing, at the processor, the application in response to the speech command comprising the application.

The executing may further include processing the speech command of the user associated with the executed application.

The processing may include processing the speech command of the user associated with the application using an application speech recognition model, which comprises an acoustic model and a linguistic model based on a set of words associated with the application comprised in the speech command.

The application speech recognition model may be updated based on a characteristic and a use pattern of the user obtained from the speech command associated with the application.

The method may also include processing a category speech recognition model, comprising an acoustic model and a linguistic model based on words associated with a category, and an application speech recognition model, comprising an acoustic model and a linguistic model based on words associated with an application, to generate a result identifying the speech command to the user terminal.

The method may also include continually updating the category speech recognition model and the application speech recognition model.

The recognizing may include recognizing a word frequently received through a microphone, and recognizing the frequently received word associated with an application.

The recognizing may include analyzing a use pattern and a voice of the user based on a word included in the speech command and adaptively updating the determination based on a result of the analyzing.

In accordance with an illustrative configuration, there is provided a non-transitory computer-readable storage medium comprising a program comprising instructions to cause a computer to perform the method previously described.

In accordance with an illustrative configuration, there is provided a user terminal, including a speech interface; and a processor operatively connected to the speech interface, wherein the processor is configured to receive a first speech command of a user through the speech interface, extract a keyword from the first speech command, provide a candidate application group of a category providing a service associated with the keyword, and process a second speech command from the user associated with an application selected from the candidate application group.

The processor may be further configured to recognize the application selected using an acoustic model and a linguistic model based on a set of words associated with the category, and process the second speech command associated with the application using an acoustic model and a linguistic model based on a set of words associated with the application.

The processor may be further configured to recognize the application from the candidate application group using a category speech recognition model, which comprises an acoustic model and a linguistic model based on a set of words associated with the category, and process the second speech command associated with the application using an application speech recognition model, which comprises an acoustic model and a linguistic model based on a set of words associated with the application.

The processor may be further configured to continually update the category speech recognition model and the application speech recognition model.

The processor may be further configured to analyze a use pattern and a voice of the user based on a word included in the first speech command and adaptively update the category speech recognition model and the application speech recognition model based on a result of the analyzing.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
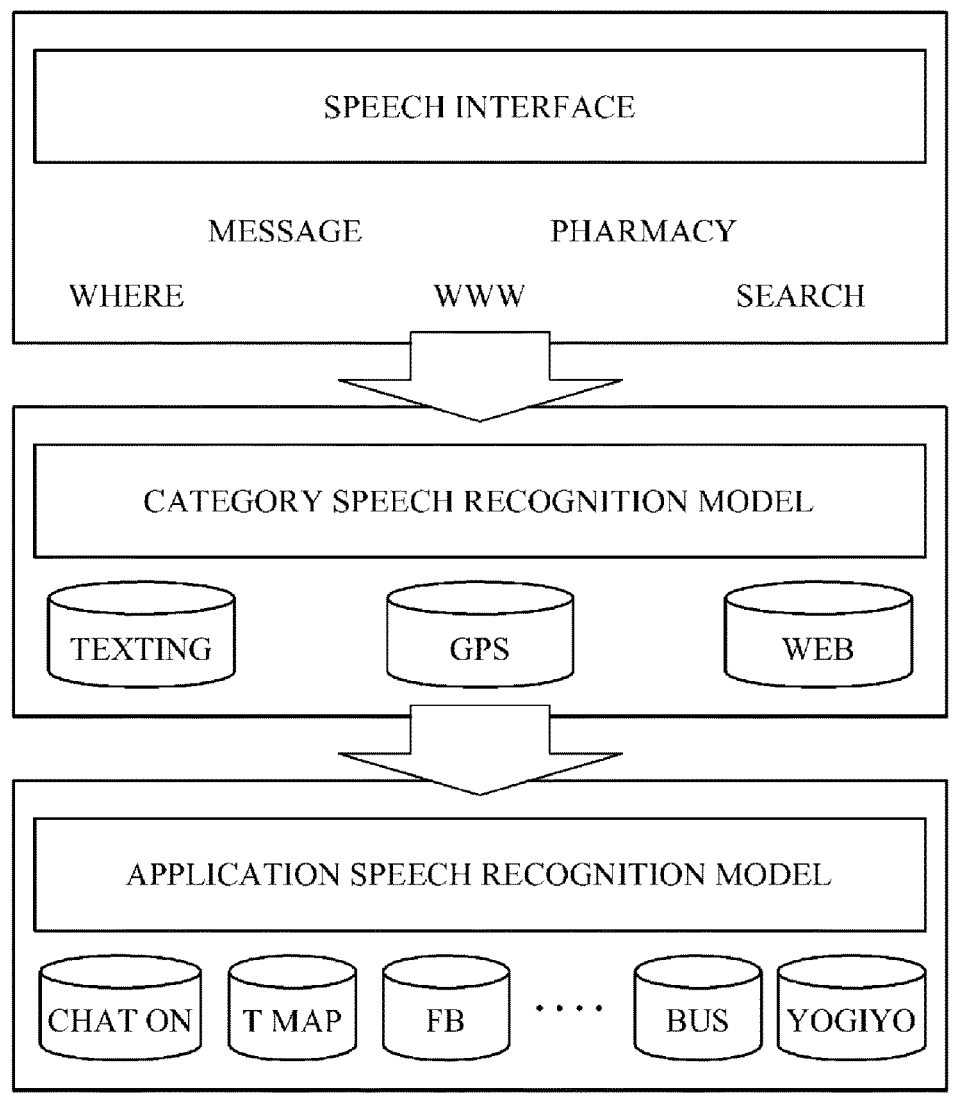
FIG. 1 is a diagram illustrating an example of a multilevel speech recognition module, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a multilevel speech recognition module, in accordance with an embodiment.

A user terminal to be described hereinafter refers to a terminal that receives a speech command of a user through a speech interface and, through a processor, performs an operation corresponding to the received speech command. For example, the user terminal may include a smartphone, a portable terminal such as a personal digital assistant (PDA), a wearable device attachable to a body of the user, a vehicle equipped with a speech command system, a smart television (TV), and other similar structural devices. The user terminal stores the multilevel speech recognition module in a memory, or interacts with the multilevel speech recognition module for speech recognition in a speech recognition server stored in a database, external to the user terminal.

Referring to FIG. 1, the user terminal extracts a keyword from a speech command of a user input through a speech interface. The keyword to be described hereinafter is a word having an important meaning among words included in the speech command of the user. For example, the keyword may indicate a word associated with an application or a word associated with a category. The user terminal provides a candidate application group belonging to a category associated with the keyword or executes an application associated with the keyword.

The candidate application group is a group of at least one application belonging to an identical category. The candidate application group includes the at least one application providing a similar type service. For example, a candidate application group belonging to a category associated with a message may include an e-mail application, a short message service (SMS) application, a messenger service application, and the like.

For example, when the extracted keyword is a word associated with the message, the user terminal provides, generates, or selects the candidate application group belonging to the category associated with the message. The user terminal provides, outputs, or generates the candidate application group to the user through voice or display.

As illustrated in FIG. 1, the category is classified into a texting, a global positioning system (GPS), and a web. In an example, the category is pre-classified in the multilevel speech recognition module or classified based on settings set by the user. The user terminal adds a category including a frequently used application or deletes a category including an application through a speech command.

In another example, the category may be classified based on a use pattern of the user terminal. The use pattern indicates a manner in which the user uses the user terminal. For example, the use pattern includes information about a time slot during which the user uses a speech recognition service through the user terminal and information about an application selected by the user through a speech command of the user. Thus, the user terminal improves user convenience by analyzing the use pattern and classifying a category based on a result of the analyzing.

The user terminal selects an application from the candidate application group. In such an example, the user terminal selects the application from the candidate application group through the speech interface or a touch interface.

For example, when the user terminal selects an application from the candidate application group through the speech interface, the user terminal uses a category speech recognition model to more accurately recognize a speech command of the user. In one illustrative example, the category speech recognition model is an acoustic model and a linguistic model based on a set of words associated with a category. The user terminal uses the category speech recognition model to more accurately recognize the speech command of the user associated with the category. Thus, the user terminal limits word recognition from the speech command of the user to a word associated with the category using the category speech recognition model so as to recognize the speech command of the user in a stepwise manner. As a result, the user terminal increases degrees of recognition and usability of the speech command.

The user terminal executes an application corresponding to the speech command of the user using the category speech recognition model. The user terminal receives a speech command associated with the application through the speech interface. For example, when the messenger application is executed, the user terminal receives a speech command, for example, "send a message to XX to meet at 7" and "check whether there is a message sent from XX."

The user terminal accurately recognizes a speech command associated with an application using an application speech recognition model. The application speech recognition model, to be described hereinafter and in accordance with an embodiment, indicates an acoustic model and a linguistic model based on a set of words associated with an application. The user terminal limits a word to be recognized from the speech command of the user to a word associated with the application using the application speech recognition model so as to recognize the speech command of the user in a stepwise manner and; accordingly, increases degrees of recognition and usability of the speech command.

Figure 2:
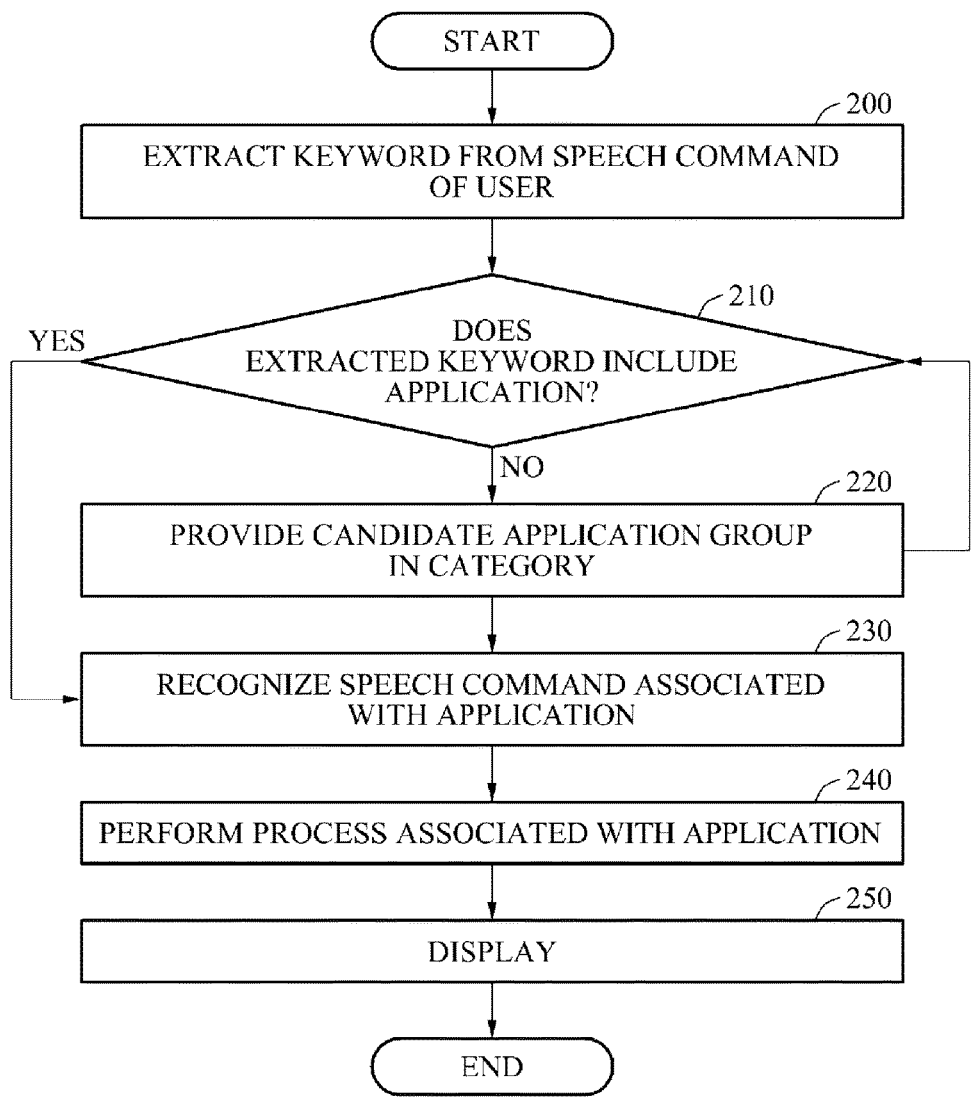
FIG. 2 is a flowchart illustrating an example of a method of recognizing a speech command of a user received through a speech interface, in accordance with an embodiment.

FIG. 2 is a flowchart illustrating an example of a multilevel speech recognition method, in accordance with an embodiment.

Referring to FIG. 2, in operation 200, the method receives at a user terminal a speech command from a user through a microphone. The method extracts through the user terminal a keyword from the received speech command.

In operation 210, the method executes at the user terminal processes corresponding to the speech command based on the extracted keyword in a stepwise manner. In operation 210, the method determines at the user terminal the process in which step is to be performed based on the extracted keyword. In an example, the method at the user terminal determines whether the extracted keyword includes a word associated with an application. The method executes at the user terminal the application or provides a candidate application group belonging to a category associated with the keyword, based on a result of determining whether the keyword includes the word associated with the application.

In operation 220, when the keyword does not include the word associated with the application, the method at the user terminal provides the candidate application group belonging to the category associated with the keyword. The candidate application group is a group of at least one application providing a service associated with a category. The method at the user terminal recognizes an application that the user desires to execute through a subsequent speech command of the user using a category speech recognition model.

In operation 230, when the keyword includes the application, or the application corresponding to the subsequent speech command of the user is recognized from the candidate application group, the method at the user terminal executes the application through a processor. Thus, the method at the user terminal recognizes the speech command of the user associated with the application.

For example, when a messenger application is executed, the method at the user terminal receives a speech command associated with the messenger application from the user. In such an example, the user terminal accurately recognizes the speech command of the user using a speech recognition model associated with the messenger application.

In operation 240, the method at the user terminal performs processes associated with a service provided by the application. For example, in a case of a messenger application, the method performs a process, for example, checking and transmitting a message, corresponding to a speech command. For another example, in a case of a renowned restaurant application, the method at the user terminal executes a process, for example, searching for information on a renowned restaurant located nearby. Thus, in operation 250, the method, through a display in the user terminal, displays a result of performing the processes associated with the application.

Figure 3:
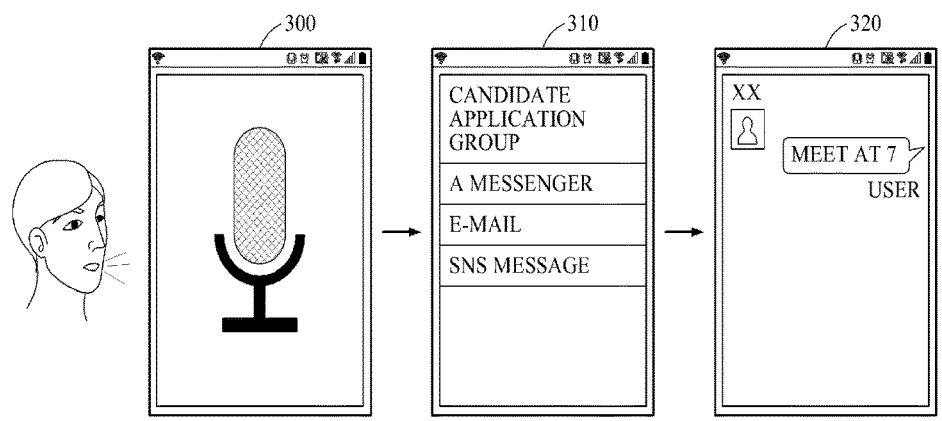
FIG. 3 is a diagram illustrating an example of a multilevel speech recognition method by providing a candidate application group based on a keyword, in accordance with an embodiment.

FIG. 3 is a diagram illustrating an example of a multilevel speech recognition method by providing a candidate application group based on a keyword, in accordance with an embodiment.

Referring to 300 of FIG. 3, a user terminal receives a speech command from a user through a microphone. For example, when the user terminal receives a speech command, for example, "check whether a message is sent from XX," the user terminal extracts a keyword by analyzing the speech command received from the user.

Referring to 310 of FIG. 3, the user terminal then asks back what message the user desires to check. For example, the user terminal outputs a question, for example, "which do you want to check among an A message, an e-mail, and a social network service (SNS) message?" through a speaker. In another example, the user terminal displays on a display a question, for example, "which do you want to check among an A message, an e-mail, and a SMS message?".

The user terminal accurately recognizes the speech command of the user using a category speech recognition model. For example, the category speech recognition model refers to a speech recognition model based on a set of words associated with a message. The user terminal limits a word to be recognized from the speech command of the user to a word associated with a category, using the category speech recognition model, in order to recognize the speech command of the user in a stepwise manner and; accordingly, increase degrees of recognition and usability of the speech command.

For example, when the user speaks the "A messenger," the user terminal recognizes the A messenger using a speech recognition model associated with a category. The user terminal receives a speech command associated with the A messenger through the microphone.

In another example, when the user terminal receives "check message received from XX," the user terminal recognizes the speech command using the speech recognition model associated with the A messenger. The speech recognition model associated with the A messenger is a speech recognition model based on a set of words frequently used in the A messenger. Thus, the user terminal limits a word to be recognized through the speech command of the user to a word associated with the A messenger using the speech recognition model associated with the A messenger in order to recognize the speech command of the user in a stepwise manner and; accordingly, increase degrees of recognition and usability of the speech command.

Referring to 320 of FIG. 3, the user terminal verifies whether a message sent from XX is present in the A messenger using a processor and displays a result of the determining through a display. Alternatively, the user terminal outputs the result of the determining through a speaker.

Figure 4:
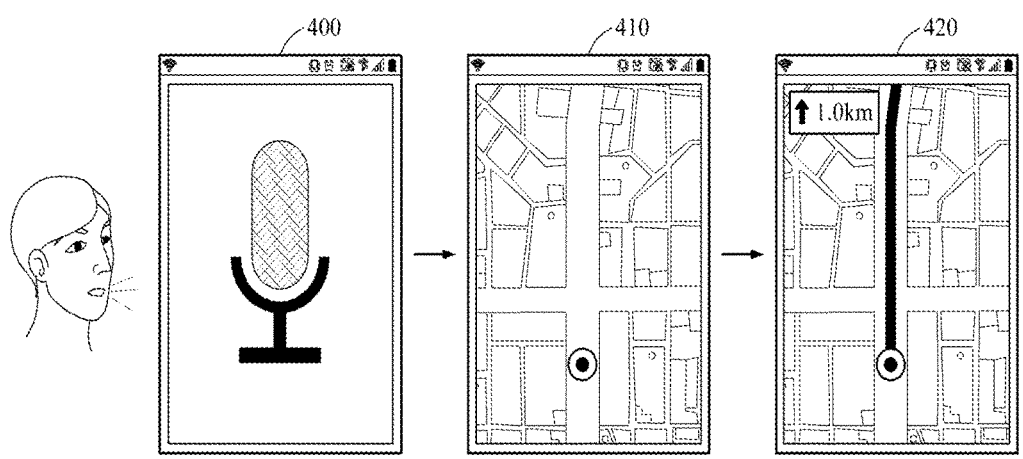
FIG. 4 is a diagram illustrating an example of a method of executing an application corresponding to a keyword extracted from a speech command of a user and processing the executed application using an application speech recognition model, in accordance with an embodiment.

FIG. 4 is a diagram illustrating an example of a method of executing an application corresponding to a keyword extracted from a speech command of a user and processing the executed application using an application speech recognition model, in accordance with an embodiment.

Referring to 400 of FIG. 4, a user terminal receives a speech command of a user through a microphone. In an example, in response to the user terminal receiving a speech command through the microphone that is associated with execution of an application, the user terminal executes the application. Referring to 410 of FIG. 4, when the user terminal receives a speech command for executing an X navigator from the user, the user terminal executes the X navigator.

The user terminal then recognizes a subsequent speech command of the user using a speech recognition model associated with the X navigator. For example, the user terminal receives a speech command associated with the X navigator through the microphone. The user terminal receives a speech command, for example, "inform me of a renowned restaurant located nearby" and "search for a route to Busan," through the microphone.

In response to the speech command, the user terminal recognizes the speech command using the speech recognition model based on a set of words associated with the X navigator. For example, the user terminal accurately recognizes the speech command using the speech recognition model based on a set of words associated with, for example, restaurants, reviews, current location, traffic information, and information on nearby buildings.

Referring to 420 of FIG. 4, when the user terminal receives a speech command, for example, "search for a route to a location abc" the user terminal searches for the route to the location abc and provides the found route.

Figure 5:
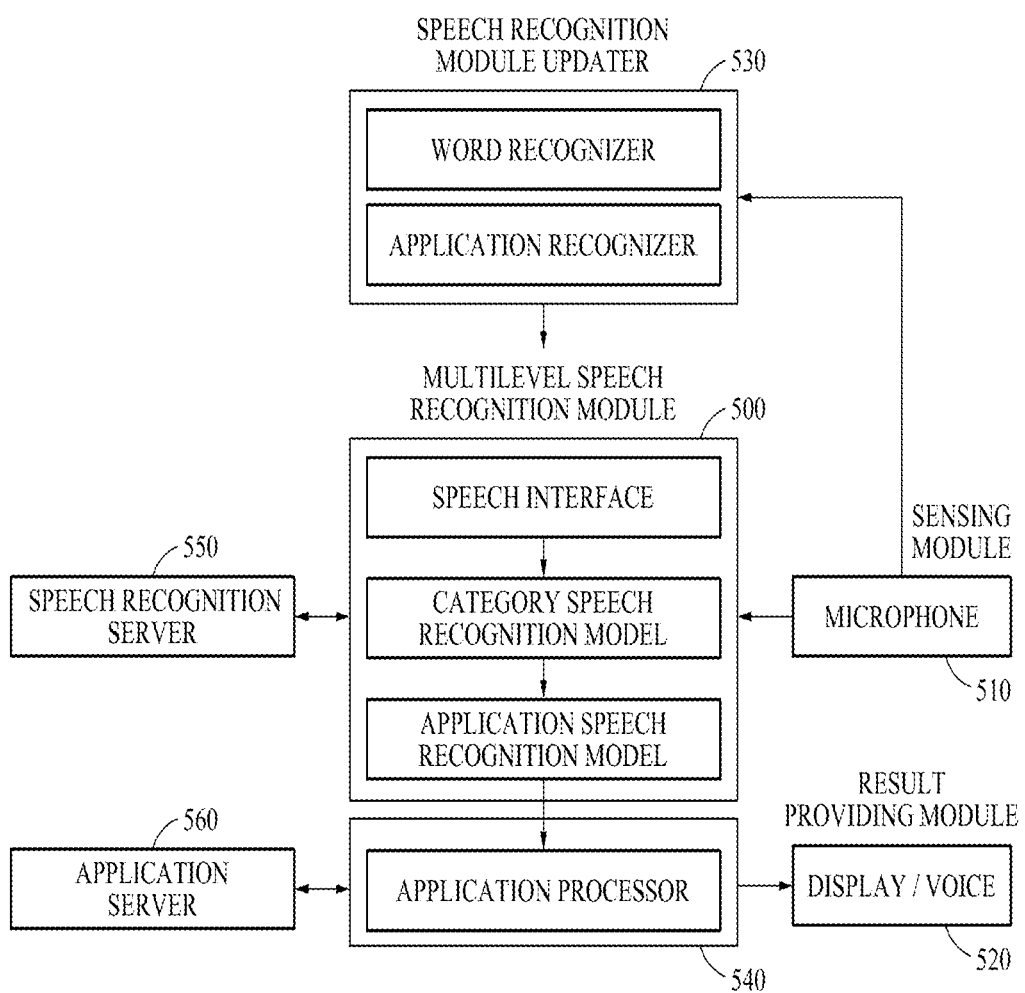
FIG. 5 is a diagram illustrating an example of a user terminal, in accordance with an embodiment.

FIG. 5 is a diagram illustrating an example of a user terminal, in accordance with an embodiment.

Referring to FIG. 5, the user terminal includes a multilevel speech recognition module 500, a sensing module 510, a result providing module 520, a speech recognition module updater 530, and an application processor 540. The multilevel speech recognition module 500, the sensing module 510, the result providing module 520, the speech recognition module updater 530, and the application processor 540 may be integrated on chip (SoC) embedded in the user terminal.

The multilevel speech recognition module 500, the sensing module 510, the result providing module 520, the speech recognition module updater 530, the application processor 540, a speech recognition server 550, and an application server 560 may be configured as individual separate structural elements or as a single integral structural element of the user terminal.

The user terminal receives a speech command of a user through a microphone in the sensing module 510. The user terminal recognizes the speech command received using the multilevel speech recognition module 500 in a stepwise manner.

In an example, the user terminal stores the multilevel speech recognition module 500 in a memory and uses the multilevel speech recognition module 500 for speech recognition. In another example, the user terminal uses the multilevel speech recognition module 500 for the speech recognition by inter-operating with or exchanging information with a speech recognition server 550 stored in a database. In detail, the user terminal transmits the received speech command to the speech recognition server 550. The speech recognition server 550 uses a category speech recognition model and an application speech recognition model stored in a database to transmit a result recognizing or identifying the speech command to the user terminal. In one configuration, the database may be stored in the speech recognition server 550. In another configuration, the database may be stored external to the speech recognition server 550. The user terminal performs a process corresponding to the result of the recognizing. The speech recognition server 550 continually updates the category speech recognition model and the application speech recognition model to increase a degree of accuracy to recognize the speech command of the user.

As illustrated in FIG. 5, the speech recognition module updater 530 includes a word recognizer and an application recognizer. The word recognizer recognizes a word frequently received through the microphone, and the application recognizer recognizes the frequency received word to be associated with an application. The speech recognition module updater 530 analyzes a use pattern and a voice of the user based on a word included in the speech command and adaptively updates the multilevel speech recognition module 500 based on a result of the analyzing.

For example, a voice, a pronunciation, and an accent may vary depending on the user. Thus, the speech recognition module updater 530 analyzes a voice, a pronunciation, and an accent of the user, and updates the multilevel speech recognition module to be suitable for the user. In addition, the speech recognition module updater 530 analyzes a word included in a speech command frequently received from the user, and updates the multilevel speech recognition module to be suitable for the user. Although the speech recognition module updater 530 is illustrated external to the multilevel speech recognition module 500, in another illustrative configuration, the speech recognition module updater 530 is included in the multilevel speech recognition module 500.

The user terminal receives information associated with an application from the application server 560, and updates the application processor based on the received information associated with the application. For example, the information associated with the application includes information associated with processes of the application. Thus, the application processor accurately performs a process corresponding to a speech command of the user by updating the information associated with the application. The user terminal provides a result of the performing of the process through a display 520 or a voice.

Although the speech recognition server 550 and the application server 560 are illustrated external to the multilevel speech recognition module 500, in another illustrative configuration, the speech recognition server 550 and the application server 560 are included in the multilevel speech recognition module 500 of the user terminal.

Figure 6:
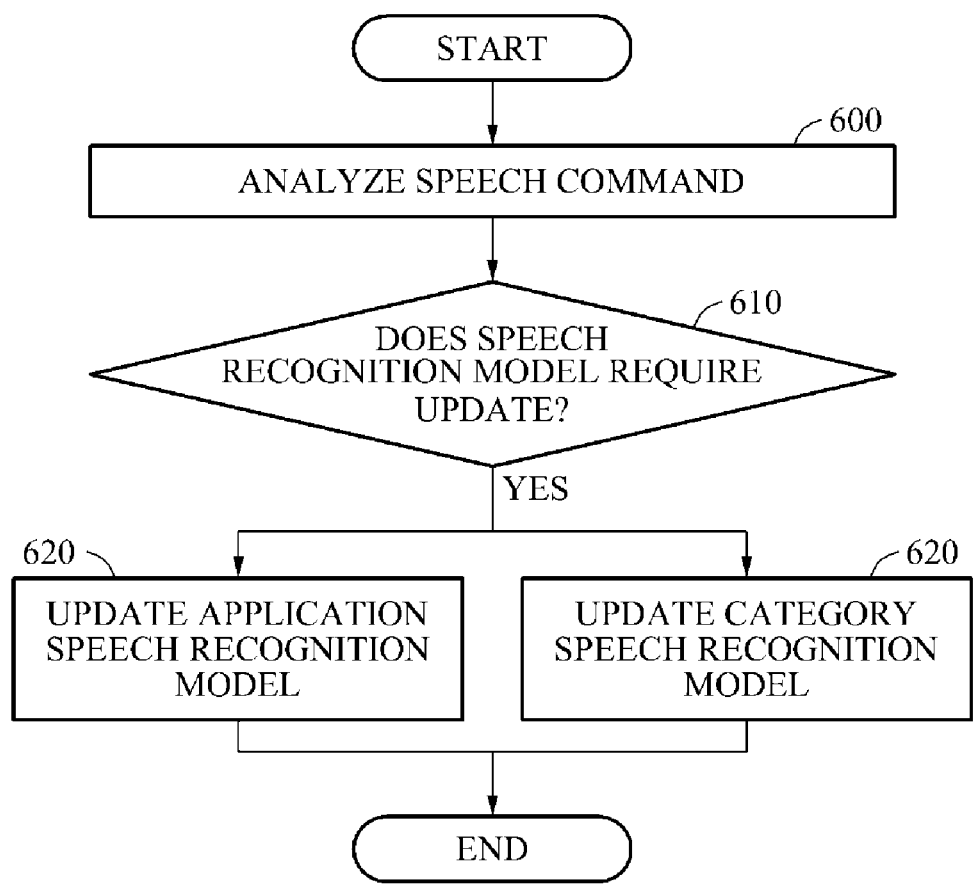
FIG. 6 is a flowchart illustrating an example of a method of updating a multilevel speech recognition module, in accordance with an embodiment.

FIG. 6 is a flowchart illustrating an example of a method of updating a multilevel speech recognition module, in accordance with an embodiment.

Referring to FIG. 6, in operation 600, the method at a user terminal analyzes a speech command received through a microphone. The method at the user terminal analyzes a use pattern and a characteristic of a user based on the speech command received through the microphone. The method at the user terminal analyzes the use pattern and a voice of the user based on a result provided based on a speech command received, more than a predetermined number of times, and the speech command. The method at the user terminal analyzes the voice, a pronunciation, and an accent of the user based on the frequently received speech command. For example, the method at the user terminal analyzes the use pattern and the characteristic of the user based on a speech command received more than the predetermined number of times and a result processed through an application processor based on the speech command.

In operation 610, the method at the user terminal determines whether a speech recognition model requires an update based on a result of the analyzing. In operation 620, when the method at the user terminal determines that the speech recognition model requires the update, the method at the user terminal updates at least one of a speech recognition model associated with an application and a speech recognition model associated with a category.

Figure 7:
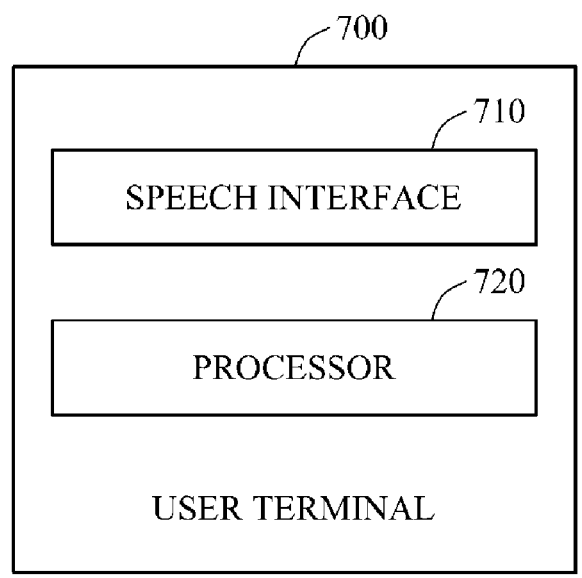
FIG. 7 is a diagram illustrating an example of a user terminal performing a multilevel speech recognition method, in accordance with an embodiment.

FIG. 7 is a diagram illustrating an example of a user terminal 700 performing a multilevel speech recognition method, in accordance with an embodiment.

Referring to FIG. 7, the user terminal 700 includes a speech interface 710 and a processor 720. The user terminal 700 receives a speech command from a user through the speech interface 710. For example, the user terminal 700 receives the speech command of the user through a microphone.

When the received speech command directly includes an application, the processor 720 executes the application.

For example, when the received speech command is in a form of general communication, for example, "play XX song," the processor 720 requests the user to provide information of an application through which playback is to be performed.

In an example, the processor 720 provides the user with a candidate application group belonging to a category associated with music to allow the user to more conveniently select an application to be executed. The processor 720 recognizes the speech command of the user using a category speech recognition model based on a word associated with the music. However, the multilevel speech recognition method is not limited to the foregoing description, and more operations may be performed to recognize a speech of the user.

Subsequent to the execution of the application, the processor 720 recognizes a subsequent speech command of the user using an application speech recognition model. For example, the processor 720 accurately recognizes a title of a desired song to be played using the application speech recognition model based on a set of words associated with information on an artist, a song title, and playback related terms. The processor 720 performs a process corresponding to the speech command of the user and provides the user with a result of the performing of the process through a display or a voice.

The units, recognizers, and models described herein may be implemented using hardware components. For example, the hardware components may include processors, controllers, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

It is to be understood that in the embodiment of the present invention, the operations in FIG. 6 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIG. 6.

Program instructions to perform a method described in FIG. 6, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multilevel speech recognition method, the method comprising:
   extracting a keyword from a first speech command received from a user;
   determining whether the extracted keyword from the first speech command of the user includes an application indication for an application using an application speech recognition model;
   in response to the extracted keyword from the first speech command being determined to not include the application indication, providing a candidate application group of a category providing a service determined to be associated with the extracted keyword, and identifying a selected application selected by the user from the provided candidate application group using a category speech recognition model based on a set of words associated with the category; and
   processing a second speech command, from the user, for the selected application selected from the provided candidate application group, using the application speech recognition model, based on a set of words associated with the selected application,
   wherein the application speech recognition model is updated based on at least one of a voice, a pronunciation, or an accent of the user obtained from the second speech command, and a word frequently received from the user included in the second speech command, the word being associated with the selected application.

2. The method of claim 1, wherein the category is determined based on a use pattern of the user obtained from the first speech command and the second speech command.

3. The method of claim 1, wherein the category speech recognition model is updated based on a characteristic and a use pattern of the user obtained from the first speech command.

4. A non-transitory computer-readable storage medium storing instructions that, when executed by a processor, cause the processor to perform the method of claim 1.

5. The method of claim 1, wherein the application speech recognition model is updated based on at least one of a voice, a pronunciation, or an accent of the user obtained from speech commands, and a word frequently received from the user included in the speech commands, and the processing of the second speech command uses the updated application speech recognition model.

6. A multilevel speech recognition method, the method comprising:
   determining, using a processor, whether a speech command of a user includes an application indication for an application by processing the speech command using an application speech recognition model,
   wherein the application speech recognition model is updated based on at least one of a voice, a pronunciation, or an accent of the user obtained from the speech command, and a word frequently received from the user included in speech commands, when the word is associated with the application indication;
   executing, at the processor, the application in response to the speech command being determined to include the application indication; and
   in response to the speech command being determined to not include the application indication, identifying a selected application selected by the user from a provided candidate application group of a category determined to be associated with the word using a category speech recognition model based on a set of words associated with the category, and executing the selected application selected from the provided candidate application group, the selected application providing a service associated with the speech command.

7. The method of claim 6, wherein the processing comprises:
   processing the speech command using the application speech recognition model, comprising an acoustic model and a linguistic model, based on a set of words associated with the selected application.

8. The method of claim 6, further comprising:
   processing, using the category speech recognition model, comprising an acoustic model and a linguistic model based on words associated with a category, and the application speech recognition model, comprising an acoustic model and a linguistic model, based on words associated with the selected application, to provide a result identifying the speech command to a user terminal.

9. The method of claim 8, further comprising:
   updating the category speech recognition model and the application speech recognition model as the processor receives additional speech commands.

10. The method of claim 6, wherein the determining comprises
    recognizing the word frequently received from the user through a microphone, and
    recognizing the word frequently received from the user as being associated with the application.

11. The method of claim 6, wherein the determining comprises
    updating the selected application based on the updated application speech recognition model.

12. A non-transitory computer-readable storage medium storing instructions that, when executed by a processor, cause the processor to perform the method of claim 6.

13. A user terminal, comprising:
    a processor, configured to
    extract a keyword from a first speech command received from a user,
    determine whether the extracted keyword from the first speech command of the user includes an application indication for an application using an application speech recognition model;
    in response to the extracted keyword from the first speech command being determined to not include the application indication, provide a candidate application group of a category providing a service determined to be associated with the extracted keyword, and identify a selected application selected by the user from the provided candidate application group using a category speech recognition model based on a set of words associated with the category; and process a second speech command, from the user, for the selected application selected from the provided candidate application group, using the application speech recognition model, based on a set of words associated with the selected application, wherein the application speech recognition model is updated based on at least one of a voice, a pronunciation, or an accent of the user obtained from the second speech command, and a word frequently received from the user included in the second speech command, the word being associated with the selected application.

14. The user terminal of claim 13, wherein the processor is further configured to:

recognize the selected application selected using an acoustic model and a linguistic model based on the set of words associated with the category, and process the second speech command using an acoustic model and a linguistic model, based on the set of words associated with the selected application.

15. The user terminal of claim 13, wherein the processor is further configured to update the category speech recognition model and the application speech recognition model as the processor receives additional speech commands.

16. The user terminal of claim 13, wherein the processor is further configured to analyze a use pattern and a voice of the user based on a word included in the first speech command and update the category speech recognition model and the application speech recognition model based on a result of the analyzing.

17. The user terminal of claim 13, further comprising:

a speech interface, operatively connected to the processor, wherein the processor is configured to receive the first speech command of the user through the speech interface.

* * * * *